US010650038B2

(12) United States Patent
Lewis et al.

(10) Patent No.: US 10,650,038 B2
(45) Date of Patent: May 12, 2020

(54) MECHANISM TO HANDLE INTERRUPTED PLAYBACK EXPERIENCE FOR MEDIA ITEMS IN PLAYLISTS

(71) Applicant: Google Inc., Mountain View, CA (US)

(72) Inventors: Justin Lewis, Marina del Rey, CA (US); Ruxandra Georgiana Paun, Santa Monica, CA (US)

(73) Assignee: Google LLC, Mountain View, CA (US)

(*) Notice: Subject to any disclaimer, the term of this patent is extended or adjusted under 35 U.S.C. 154(b) by 852 days.

(21) Appl. No.: 14/225,656

(22) Filed: Mar. 26, 2014

(65) Prior Publication Data
US 2015/0278209 A1 Oct. 1, 2015

(51) Int. Cl.
G06F 16/438 (2019.01)
(52) U.S. Cl.
CPC .............................. G06F 16/4387 (2019.01)
(58) Field of Classification Search
CPC ......... G06F 17/30053; G06F 17/30389; G06F 17/30424; G06F 17/30483; G06F 17/30554; G06F 16/4387; G06F 16/4393; H04N 21/262; H04N 21/26258
See application file for complete search history.

(56) References Cited

U.S. PATENT DOCUMENTS 6,389,467 B1    5/2002  Eyal
8,195,635 B1*   6/2012  Lee ..................... G06F 16/903
                                                       707/706
9,037,683 B1*   5/2015  Yoden ..................... H04L 65/60
                                                       709/219
2003/0033420 A1* 2/2003 Eyal .................. G06F 17/30038
                                                       709/231
2003/0236695 A1* 12/2003 Litwin, Jr. ............. G06Q 10/06
                                                       705/7.29

(Continued)

FOREIGN PATENT DOCUMENTS

CN    101267330 A    9/2008
CN    101662651 A    3/2010
CN    102290081 A    12/2011

OTHER PUBLICATIONS

Hacking NetFlix : Getting Movies & TV Shows in the Proper Order, Nov. 2007. [Retrieved on Jul. 24, 2017]. Retrieved from the Internet < URL: http://www.hackingnetflix.com/2007/11/getting-movies-.html > (Year: 2007).*

(Continued)

Primary Examiner — James E Richardson
(74) Attorney, Agent, or Firm — Lowenstein Sandler LLP

(57) ABSTRACT

A method may include in response to a user request for a playlist, identifying, by a processing device, a plurality of media items from the playlist, for each of the plurality of media items, determining whether a respective media item is available for a playback on a user device, in response to a determination that the respective media item is not available for the playback on the user device, causing the use device to advance to a next media item on the playlist without user interaction, and in response to a determination that the respective media item is available for the playback on the user device, causing the user device to play the respective media item.

20 Claims, 5 Drawing Sheets

(56) References Cited

U.S. PATENT DOCUMENTS

| | | | |
|---|---|---|---|
| 2005/0060264 A1* | 3/2005 | Schrock | G11B 27/105 |
| | | | 705/51 |
| 2005/0278377 A1 | 12/2005 | Mirrashidi et al. | |
| 2007/0171903 A1* | 7/2007 | Zeng | H04L 29/06027 |
| | | | 370/389 |
| 2009/0320075 A1* | 12/2009 | Marko | H04H 20/40 |
| | | | 725/56 |
| 2010/0235739 A1 | 9/2010 | Rathi et al. | |
| 2010/0332919 A1* | 12/2010 | Ito | G11B 27/11 |
| | | | 714/57 |
| 2011/0035223 A1 | 2/2011 | Schiller | |
| 2011/0113051 A1 | 5/2011 | Lindahl et al. | |
| 2013/0031162 A1 | 1/2013 | Willis et al. | |
| 2013/0047084 A1 | 2/2013 | Sanders et al. | |
| 2013/0061296 A1 | 3/2013 | Reddy et al. | |
| 2013/0110848 A1 | 5/2013 | Svendsen | |
| 2013/0179496 A1* | 7/2013 | Wynn | G06Q 30/06 |
| | | | 709/203 |
| 2013/0325609 A1 | 12/2013 | Sokolov et al. | |
| 2014/0123005 A1* | 5/2014 | Forstall | G06F 3/04817 |
| | | | 715/716 |
| 2014/0282772 A1* | 9/2014 | Chen | H04N 21/26258 |
| | | | 725/97 |
| 2014/0304366 A1* | 10/2014 | Fletcher | H04L 65/1066 |
| | | | 709/217 |
| 2014/0325568 A1* | 10/2014 | Hoang | H04N 21/235 |
| | | | 725/61 |
| 2015/0012416 A1* | 1/2015 | Woods | G06Q 50/18 |
| | | | 705/39 |
| 2015/0113022 A1* | 4/2015 | Martin | G06F 17/30761 |
| | | | 707/796 |

OTHER PUBLICATIONS

International Search Report for PCT/US2015/022533, dated Jul. 6, 2015.
EP Search Report for EP Application No. EP15768347 dated Jun. 28, 2017, 10 pages.
China National Intellectual Property Administration, Notification of First Office Action for Application No. 201580015693.4, dated Feb. 3, 2019, 20 pages.
China Nat'l Intellectual Property Administration, 2nd Office Action, Application No. 201580015693.4, dated Jul. 16, 2019, 23 pages.
EP Office Action for EP Application No. 15768347.5, dated Jul. 26, 2018, 7 pages.
EP Summons to attend oral proceedings for EP Application No. 15768347.5, dated May 25, 2019, 8 pages.

* cited by examiner

MECHANISM TO HANDLE INTERRUPTED PLAYBACK EXPERIENCE FOR MEDIA ITEMS IN PLAYLISTS

TECHNICAL FIELD

This disclosure relates to the field of media contents and, in particular, to systems and methods to handle interrupted playback experience for media items in playlists.

BACKGROUND

Users may use user devices to consume media content. User devices may include desktop computers, laptop computers, tablet computers, handheld devices (such as portable media players and smart phones), and any suitable devices. Media content may include video clips, audio clips, and images which are collectively referred to as media items hereinafter. These media items may be stored on user devices such as memory and hard drives of the user devices. These media items may also be made available to the users through content providing services such as content sharing platforms.

Multiple media items may be grouped together into a playlist. Media player software ("media player") may then be used to play the media items from the playlist continuously without the need for the user to manually forward to a next media item after finishing the current one. For example, music videos by a certain singer may be grouped together into a playlist. When a user requests this playlist, the media player may present the playlist and start playing music videos according to the playlist.

A playlist may be authored by one or more authors and then published on a content sharing platform for the public to enjoy. This type of playlists may be referred to as public playlists. Public playlists may be provided by a content sharing platform so that the user devices of the public may retrieve the playlist and play media items on the playlist. Alternatively, a playlist may be only accessible by a limited number of viewers. This type of playlists may be referred to as private playlists.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method including in response to a user request for a playlist, identifying, by a processing device, a plurality of media items from the playlist, for each of the plurality of media items, determining whether a respective media item is available for a playback on a user device, in response to a determination that the respective media item is not available for the playback on the user device, causing the use device to advance to a next media item on the playlist without user interaction, and in response to a determination that the respective media item is available for the playback on the user device, causing the user device to play the respective media item.

Implementations of the disclosure may include a method including in response to a user request for a playlist, presenting, by a processing device, the playlist comprising a plurality of media items, and initiating a sequential playback of the plurality of media item, and when any of the plurality of media items is unavailable for the playback, presenting an error message to a user, and advancing to a next media item on the playlist without user interaction.

BRIEF DESCRIPTION OF THE DRAWINGS

The present disclosure is illustrated by way of example, and not by way of limitation, in the figures of the accompanying drawings.

DETAILED DESCRIPTION

Figure 1:
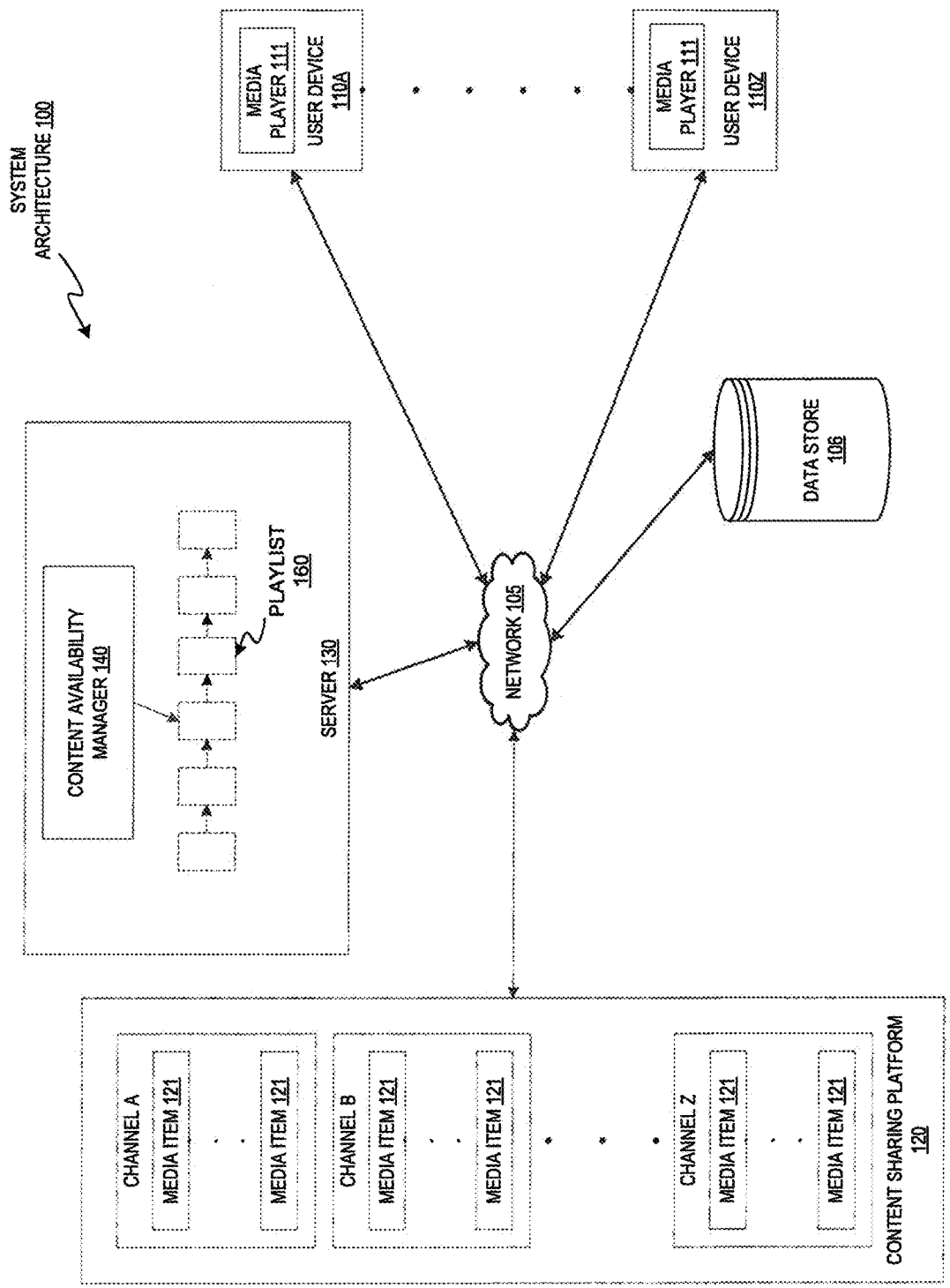
FIG. 1 illustrates an example system architecture in accordance with implementations of the disclosure.

Aspects of the present disclosure are directed to handling interrupted playback experience for content items in playlists. A playlist may be a file that contains data links to an ordered set of media items. For example, the playlist may include hyperlinks pointing to the Uniform Resource Locators (URLs) or web addresses through which media items in the playlist may be retrieved over the Internet. The playlist may also include directory paths through which media items in the playlist may be retrieved from data storage on which the media items are stored.

The media player on a user device may receive media items in the playlist from a server (e.g., receive as streamed media contents from a content sharing platform), and render the media items in the order defined by the playlist. For example, the media player may continuously play video clips one after another without any user input. In another example, a user may directly navigate to a specific video in the playlist, changing the order defined by the playlist.

If all of the media items on the playlist are available at the time of playing, users of the playlist may continuously enjoy the contents of the media items. However, for different reasons, some or all of the media items may become unavailable to the media players of certain user devices. For example, a video may be not available in a particular country, or a video may have been removed from a content sharing platform. A video may be only available as a pay-to-play premium. For example, user devices at certain geographic regions may be blocked from receiving certain media items because of copyright restrictions for those regions. Also, it is possible that after a playlist is created, the owner of a media item may subsequently remove the media item from its original location. Thus, the playlist may contain a dangling link that is not coupled to any accessible content. Also, a dangling link may occur when the location pointed to by the link becomes temporarily unavailable due to network connection problems. Thus, if for any of the above reasons, a media item from the playlist becomes unavailable at its turn to play, the play of media items on the playlist may come to a stoppage. In this situation, the user needs to manually advance the play to a next media item (e.g., by pushing a forward button on a user interface) in the playlist.

The manual advance from an unavailable media item to a next media item causes an interruption to the user's otherwise hands-free viewing experience of the media items in the playlist. For example, the user may listen to the music of a playlist in the background while working on something else. The stoppage of the playlist may cause the user to stop the work in order to restart the playlist, thus creating unsatisfactory user experience. Unsatisfactory user experience may lead to shorter play sessions which may directly impact the usage time of content sharing platforms.

Implementations of the disclosure may include systems and methods that identify one or more media items from a playlist and determine whether each of the media items is available for a playback on a user device. If a media item is not available for playback on the user device, a server may cause a media player of the user device to advance to next media item on the playlist without user interaction with the user device. However, if the media item is available for a playback on the user device, the media player of the user device starts playing the media item. In this way, the hands-free user experience of a playlist may be preserved without further user actions.

FIG. 1 illustrates an example system architecture 100, in accordance with some implementations of the disclosure. The system architecture 100 includes user devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The user devices 110A through 110Z may each include computing devices such as personal computers (PCs), laptops, mobile phones, smart phones, tablet computers, netbook computers etc. In some implementations, user device 110A through 110Z may also be referred to as "client devices." Each user device includes a media player 111. In one implementation, the media players 111 may be applications that allow users to view content, such as images, videos, web pages, documents, etc. For example, the media player 111 may be a web browser that can access, retrieve, present, and/or navigate content (e.g., web pages such as Hyper Text Markup Language (HTML) pages, digital media items, etc.) served by a web server. The media player 111 may render, display, and/or present the content (e.g., a web page, a media player) on a user device to a user. The media player 111 may also be an embedded media player (e.g., a Flash® player or an HTML5 player) that is embedded in a web page (e.g., a web page that may provide information about a product sold by an online merchant). In another example, the media player 111 may be a standalone application that allows users to view media items (e.g., digital videos, digital images, electronic books, etc.).

The media players 111 may be provided to the user devices 110A through 110Z by the server 130 and/or content sharing platform 120. For example, the media players 111 may be embedded media players that are embedded in web pages provided by the content sharing platform 120. In another example, the media players 111 may be applications that are downloaded from the server 130 and installed on user devices 110A-110Z.

In general, functions described in one implementation as being performed by the content sharing platform 120 can also be performed on the user devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items. Server 130 may be part of the content sharing platform 120 and may be hosted by the same computing device(s) as the content sharing platform 120. Alternatively, server 130 may be part of a different computer system or an independent computer system including one or more computing devices (such as a rackmount server, a router computer, a server computer, a personal computer, a mainframe computer, a laptop computer, a tablet computer, a desktop computer, etc.).

The content sharing platform 120 may include multiple channels (e.g., channels A through Z). A channel can be data content available from a common source or data content having a common topic or theme.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, server 130 may include a content availability manager 140 to manage playlists accessible by the server. In response to receiving a request for a playlist, content availability manager 140 may identify media items of the playlist. If content availability manager 140 determines that any media items are not available for a playback, content availability manager 140 may send a message to the user device indicating that specific media item is unavailable for a playback on the user device. The determination may be performed for all media items on the playlist when identifying the media items in the playlist. Alternatively, the determination may be performed for a media item that is about to be streamed to the user device. In response to the determination that one or more media items are unavailable for the playback, the content availability manager 140 may instruct media player 111 to skip the one or more unavailable media items and automatically play the next available media item on the playlist without the need for user interaction. Meanwhile, media player 111 may receive and display an error message from content availability manager 140 indicating that these media items are unavailable.

Playlist 160 may include an ordered list of media items according to which the media items are to be played on the user device. The media items can be streamed to the user device from the data store 106 according to the order of the playlist 160 or in any other order (e.g., e.g., sequentially or in parallel). Content availability manager 140 may maintain a pointer that points to the current media item being played on the user device. When the media player 11 on the user device finishes (or is about to finish) playing the current media item, content availability manager 140 may receive an indicator from the user device. For example, the user device may send a signal to the server 130, which indicates that the content availability manager 140 should advance the pointer to a next media item according to the order of the playlist and should instruct the media player to play the next media item on the user device.

In response to the above indication of the user device, content availability manager 140 may determine if the next-to-be-played media item is available for the playback on the user device. As previously discussed, the next media item may be unavailable to the user device for different reasons. For example, content availability manager 140 may retrieve a copyright information from the metadata of the next media item and determine (e.g., based on the geographic location of the user device) if the user device has the proper copyright permission to receive the next media item. Content availability manager 140 may also check if the next media item still exists at the location indicated on the playlist. If content availability manager 140 determines that the next media item is available for a playback on the user device, it may advance the current pointer to the next media item to make it current and instruct the media player to play the current media item. However, if content availability manager 140 determines that the next media item is not available for a playback on the user device, content availability manager 140 may proceed to the subsequent media item in the playlist to determine if the subsequent media item is available for playback on the user device. This process may continue until an available media item is found. If content availability manager 140 determines that a media item from further down the playlist is available to the user device, it may move the pointer to point to this media item and make it current to grant the user device a permission of a playback of the current media item. Content availability manager 140 may also send the user device an error message indicating that one or more media items on the playlist have been unavailable and should be skipped over.

In one implementation, in response to receiving an instruction to play the next available media item in the playlist and an error message indicating that one or more media items should be skipped over, the media player executing on the user device may play the next available media item without the need for further interaction from the user. According to some implementations, the media player may display a message on the screen of the user device indicating that one or more media items are unavailable.

In another implementation, in response to receiving an instruction to play the next available media item in the playlist and an error message indicating that one or more media items should be skipped over, the media player of the user device may delay the playback of the next available media item for a predetermined time. For example, in one implementation, the media play may display a timer to show the remaining time till the start of the playback of the next available media item. The media player may also display a description (e.g., title) of the next available media item scheduled for the playback and may also display descriptions of the one or more media items that are unavailable. In this way, the user may have the option to pause the playback of the next available media item during the delay period. However, by default, the media player of the user device starts the playback of the current media item on the playlist 160 if the media player does not receive a user request to pause the playback.

Implementations of the disclosure may also detect situations in which skipping the unavailable media item(s) may not be the desirable user experience. In one implementation, content availability manager 140 may determine if the playlist is a sequence of episodes that may need to be consumed sequentially. Examples of episodes may include a situation where earlier episodes are pre-requisite classes for later classes. In one implementation, content availability manager 140 may make the determination based on the metadata of the playlist. For example, the metadata may include a flag that indicates the preference of a sequential playback in the event of an unavailable media item. If content availability manager 140 determines that sequential playback is preferred over skip-over for this playlist, content availability manager 140 may inform the user device of this particular mode. In response, the media player of the user device may stop the playback of the media items on the playlist and display a message to inform the user of the missing episode. Instead of automatically advancing to a next available media item, the media player may wait for further instructions from the user before any further playback.

In one implementation, content availability manager 140 may receive a request from the user device to play a particular media item in the playlist. For example, a user may directly navigate to the particular item in the playlist via a user interface (e.g., a watch page) because the user's primary interest of the user is in the particular media item. If the user-requested media item happens to be unavailable, it may not be the right user experience to skip the this media item. Instead, in one implementation, the media player of the user device may not play the next available media item on the playlist, but rather display a message to inform the user of the missing media item.

Content availability manager 140 determines that all subsequent media items (following the just-finished media item) in the playlist are unavailable. In the event that this situation occurs, content availability manager 140 may instruct the media player to stop the playback of the playlist.

Alternatively, content availability manager 140 may cause the user device to loop the same just finished media item.

Figure 2:
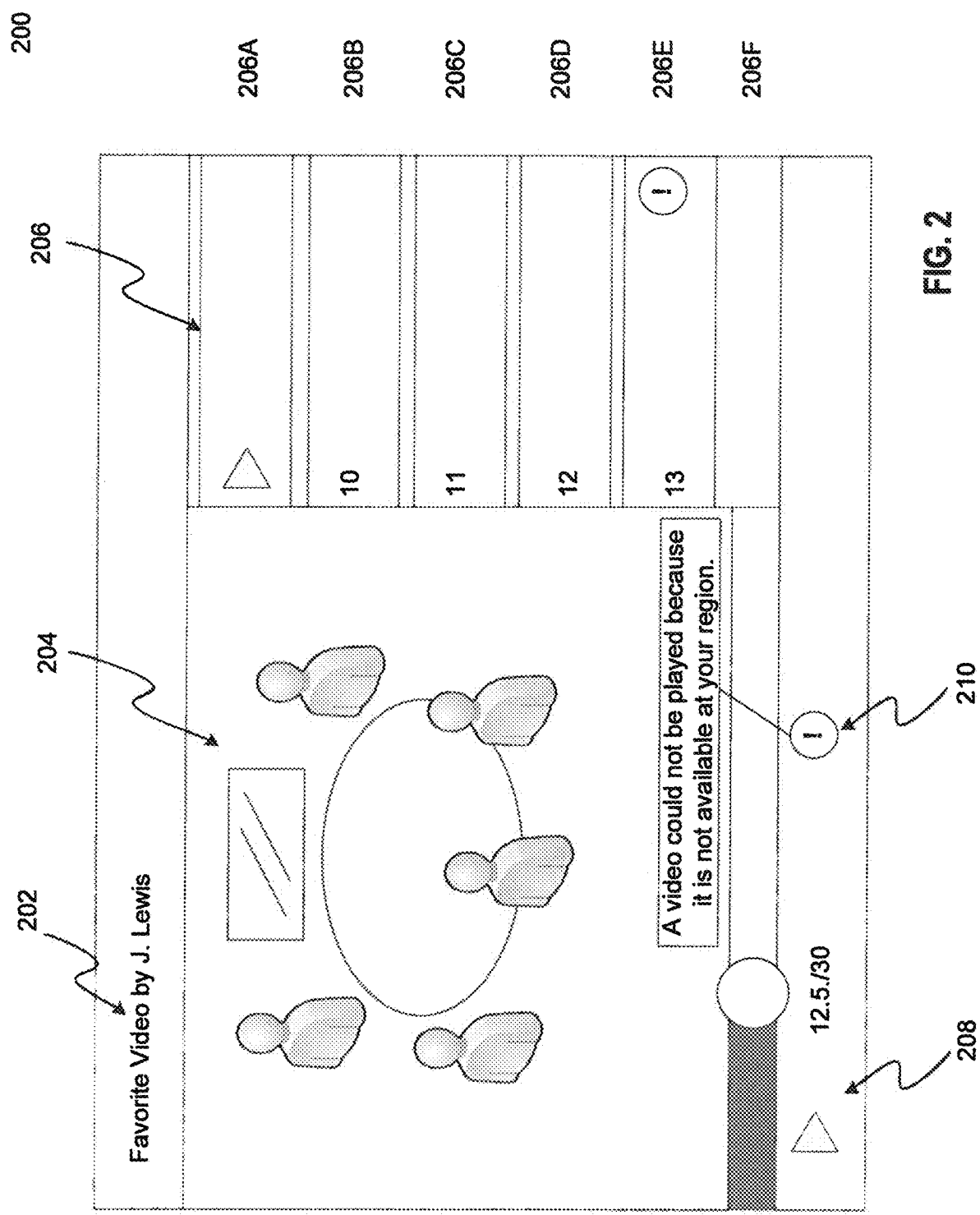
FIG. 2 illustrates an example media player including a user interface according to an embodiment of the disclosure.

FIG. 2 illustrates an example user interface 200 of a media player 111 according to an embodiment of the disclosure. Referring to FIG. 2, the user interface 200 of media player 111 may include a number of sections 202-208 to display content and information of a playlist. First display section 202 includes an information bar that may display information regarding the playlist. For example, the information bar may display the title and author of the playlist. Second display section 204 may include the display region (or canvas) to render the content of a media item such as a video clip. Thus, second display section 204 may display the video (or time synchronized video frames). Alternatively, if the media item is an audio clip, section 204 may simply display an image or graphic representing the audio clip. If the media item is a stack of images, section 204 may display these images. Third display section 206 may include actionable elements 206A-206F each corresponding to one media item on the playlist. In one implementation, the order of actionable elements (from top to bottom) may indicate the order according to which media items 206A-206F should be played. The media item that is currently in being played may be highlighted. As shown in FIG. 2, for example, media item 206A is currently being played in region 204 while media items 206B-206F are in the queue to be played subsequently. Action elements 206A-206F are actionable in the sense that each actionable element may be selected (e.g., at the direction of a user) for playback in the region 204. Fourth display section 208 may include functional and display elements. For example, section 208 may include "play" button that may be toggled between a "play" mode and "pause" mode. Section 208 may also include actionable element to change volume, and display elements (a slide and text display) indicating the whole duration of the playback and time from the start of the playback. Further, section 208 may include actionable/display elements such as closed caption, settings, and screen sizes.

In one implementation, the media player 111 receives a message indicating that one or more media items on the playlist are unavailable and may display a warning informing the user about it. For example, as shown in FIG. 2, a warning message 210 may be displayed at a non-intrusive place (such as a lower right corner of section 204). Correspondingly, a visual indicator (e.g., the same as warning sign 210) may be displayed on the actionable element corresponding to the unavailable media item (e.g., action element 206E) in section 208. In one implementation, received messages of unavailable media items may be stored in a queue either on the user device or transmitted to the server so that they may be used for later debugging.

Referring back to FIG. 1, in one implementation, media player 111 may further include functionality (similarly to content availability manager 140) to determine if media items on a playlist are available for playback. Compared to the determination at the server 130 by content availability manager 140, the determination by media player 111 may take advantage of easy access to playlists (such as private playlists) stored on user device 110.

In one implementation, in response to a request for a playlist, media player 111 may determine if any media item in the playlist are unavailable for playback on the user device. In response to a determination that one or more media items are unavailable for the playback, media player 111 may skip the one or more unavailable media items and automatically advance to the next available media item on the playlist without the need for user interaction. Meanwhile, media player 111 may also display a message indicating that these media items are unavailable. Alternatively, media player 111 may delay the playback of the next available media item for a period of time. For example, media player 111 may display a clock (e.g., on section 204 of FIG. 2) to indicate time remaining until the start of the playback of the next available media item on the playlist. Media player 111 may also display a message indicating that one or more media items are unavailable. Media player 111 may handle playlists stored on the user device and provide functionality similar to that of content availability manager 140. Alternatively, the user device may include a local content availability manager to cooperate with the media player 11 and handle interrupted playback experience for media items in local playlists in a manner discussed above.

Figure 3:
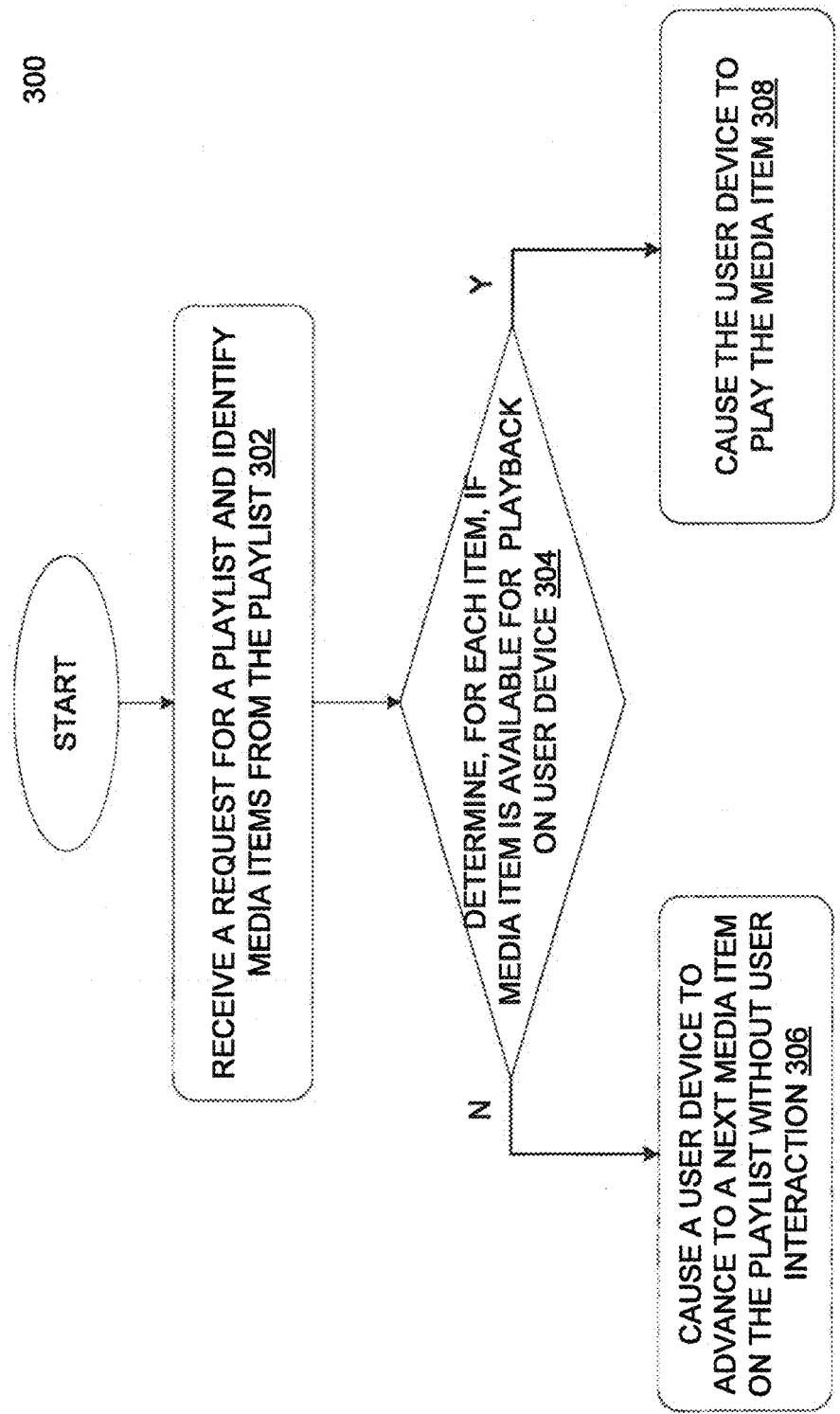
FIG. 3 is a flow diagram illustrating a method to manage a playlist according to some implementations of the disclosure.

FIG. 3 is a flow diagram illustrating a method 300 to manage a playlist according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by content availability manager 140 as shown in FIG. 1.

Referring to FIG. 3, at 302, the content availability manager may receive a request for a playlist of media items. The request may be made by a user device (e.g., at the direction of a user) to the server. In response to receiving the request, the content availability manager may identify media items contained on the playlist for streaming to the user device. At 304, for each media item in the playlist, the content availability manager may determine whether that media item is available for playback on the user device. The determination may be based on whether the user device has the proper permission (such as copyright) to the media item, based on whether the media item has been removed from its storage, etc. In some implementations, the above determination can be made prior to streaming a corresponding media item to the user device. Alternatively, the streaming of the media items may be done independently from the above determination. For example, all available media items in the playlist may be streamed by a component other than the content availability manager (e.g., in parallel or sequentially using the order defined by the playlist or any other order). This other component may record information about the available media items that have been streamed to the user device, and the content availability manager may subsequently use this recorded information to make the above determination. For example, the content availability manager may make the above determination upon receiving a signal from the user device that the playback of a preceding media item is completed or is about to be completed.

At 306, in response to a determination that the media item in the playlist is not available for playback on the user device, the content availability manager may cause the user device to advance to a next media item in the playlist, where the advancement is carried out on the user device without user interaction. In some implementations, the content availability manager may cause the user device to advance to the next media item by sending to the user device an error message indicating unavailability of the current media item and an instruction to begin playing the next media item in the playlist. If the next media item has not been streamed to the user device yet, the content availability manager may also stream the next media item to the user device.

At 308, in response to a determination that the media item in the playlist is available for playback on the user device, the content availability manager may cause the user device to play the media item. For example, the content availability manager may send an instruction to begin playing the media item. If the media item has not been streamed to the user device yet, the content availability manager may also stream the media item to the user device.

Figure 4:
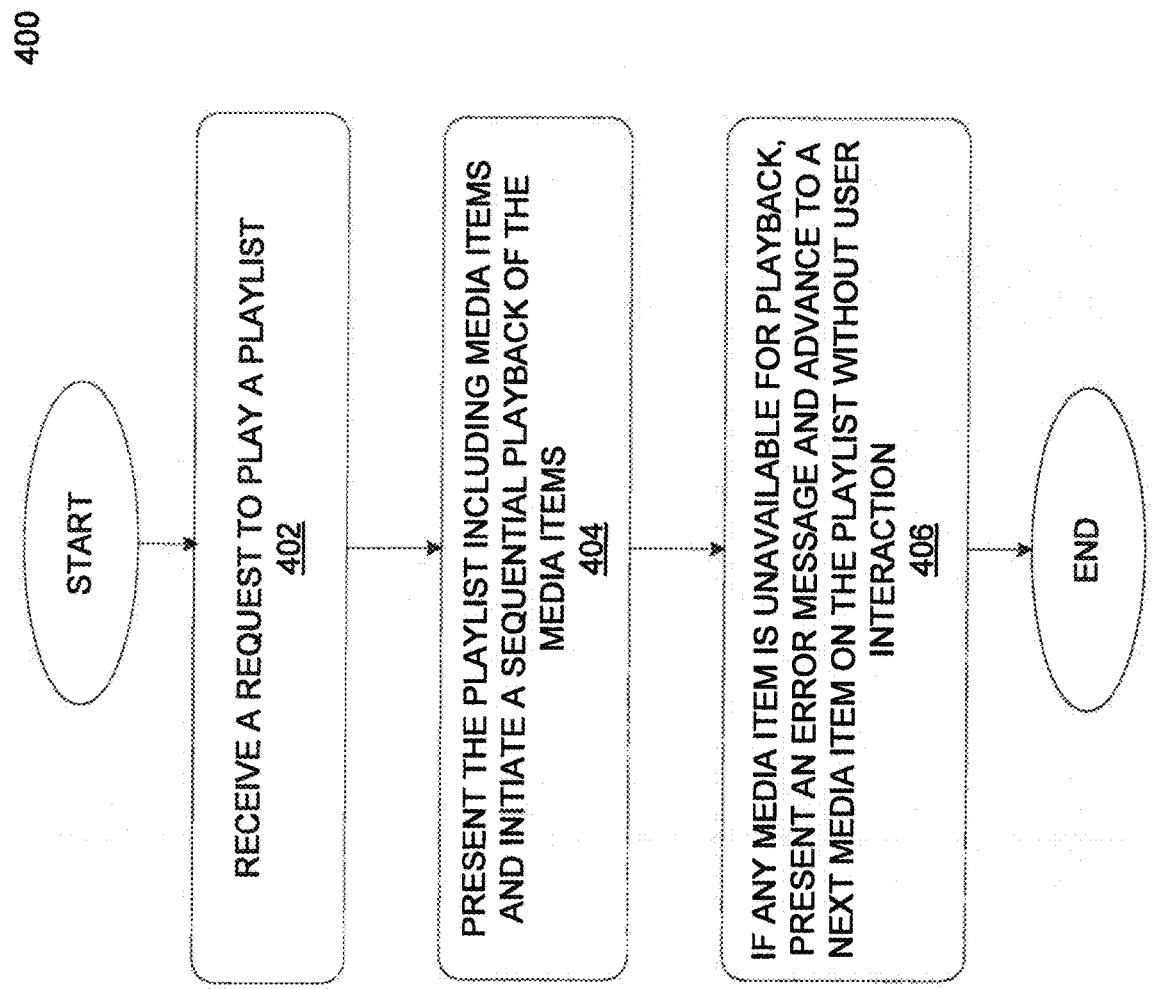
FIG. 4 is a flow diagram illustrating another method to play a playlist according to an implementation of the disclosure.

FIG. 4 is a flow diagram illustrating another method 400 to play a playlist according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by user device 110 as shown in FIG. 1.

Referring to FIG. 4, at 402, a user device including a media player may receive a user request for a playlist. The request may be generated in response to a user selection of the playlist in a user interface. The user device may retrieve the playlist from a local storage of the user device or request it from a server of a content sharing platform. At 404, the user device may present the playlist listing media items in a user interface. The user interface may include a first section for rendering the content (e.g., video or audio) of media items, and a second section for presenting elements corresponding to each media item. In response to the request for the playlist, the media play may initiate a sequential playback of the media items. At 406, if any media item in the playlist is unavailable for playback on the user device, the media player may present an error message at a non-intrusive location on the user interface and advance the playback to a next media item in the playlist without any user interaction. The error message may indicate that one or more media items are not available. In one implementation, an indication that a media item is unavailable is received from a server. Alternatively, the determination may be made by the media player based certain criteria, such as, whether the user device has the proper permission (e.g., copyright) to access the media item, etc.

Figure 5:
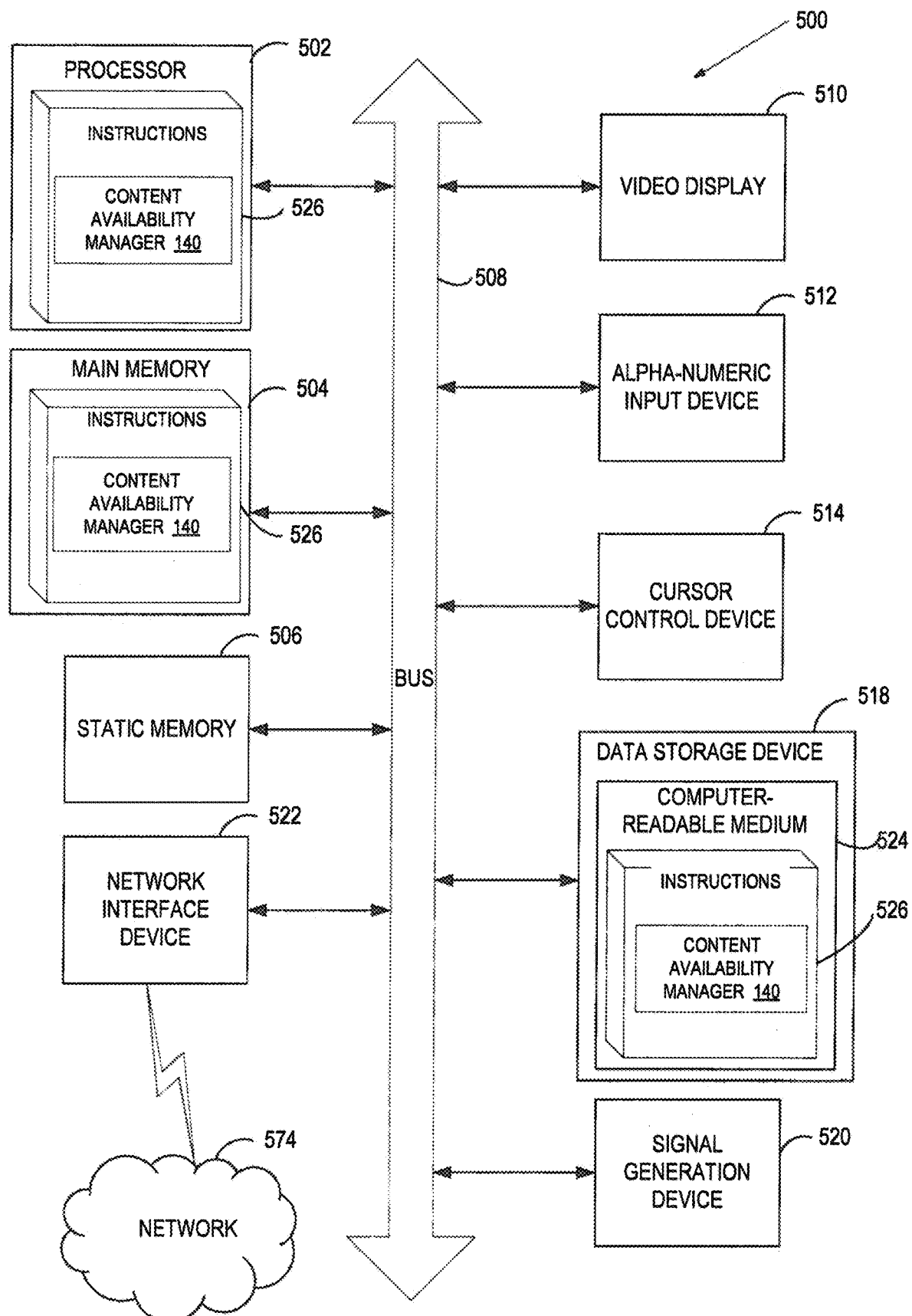
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one implementation, the instructions 526 include instructions for a content availability manager 140, which may correspond, respectively, to their identically-named counterparts described with respect to FIG. 1, and/or a software library containing methods that manage the playback of a playlist on a content sharing platform. While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    in response to receiving a request from a user device for a playlist, identifying, by a processing device, a plurality of media items from the playlist;
    causing, by the processing device, the user device to display the plurality of media items from the playlist;
    in response to receiving a user selection of a first media item directly from the displayed plurality of media items, determining whether the first media item is available for a playback on the user device;
    in response to determining that the first media item is not available for the playback on the user device, causing the user device to display message indicating that the first media item is not available, wherein the message is to be displayed on the user device with a timer indicating time remaining before starting to play a next available media item;
    determining whether a user preference is to play the first media item when the first media item becomes available or to skip to a next media item following the first media item on the playlist;
    in response to determining that the user preference is to skip to the next media item on the playlist, causing the user device to advance to the next available media item on the playlist without user interaction;
    in response to determining that the user preference is to play the first media item when the first media item becomes available, causing the user device to pause the playback of the plurality of media items from the playlist until the first media item becomes available; and
    in response to determining that the first media item is available for the playback on the user device, causing the user device to play the first media item.

2. The method of claim 1, wherein causing the user device to advance further comprises:
    streaming the next available media item to the user device; and
    instructing a media player on the user device to skip the first media item and to play the next available media item.

3. The method of claim 1, wherein causing the user device to display the message comprises transmitting the message to the user device.

4. The method of claim 3, wherein the message is to be displayed on the user device prior to playing the next available media item.

5. The method of claim 3, wherein the message is to be added to a queue for subsequent debugging.

6. The method of claim 1, further comprises:
providing a watch page user interface to present the playlist, wherein each unavailable media item is to be identified on the playlist using a visual indicator.

7. The method of claim 1, wherein the user preference is stored in a metadata associated with the playlist.

8. The method of claim 7, wherein the user preference indicates to sequentially play the plurality of media items on the playlist without skipping any media item on the playlist.

9. The method of claim 1, further comprising
in response to determining that the first media item is not available for the playback on the user device, causing the user device to delay the playback of the next available media item for a predetermined time, wherein the predetermined time corresponds to the time remaining before starting to play the next available media item indicated by the displayed timer.

10. The method of claim 1, further comprising
in response to determining that the first media item is not available for the playback on the user device, causing the user device to display a first description of the first media item and a second description of the next available media item.

11. An apparatus comprising:
a data store; and
a processing device communicably coupled to the data store, the processing device to execute instructions to:
in response to receiving a request from a user device for a playlist, identify a plurality of media items from the playlist;
cause the user device to display the plurality of media items from the playlist;
in response to receiving a user selection of a first media item directly from the displayed plurality of media items, determine whether the first media item is available for a playback on the user device;
in response to determining that the first media item is not available for the playback on the user device, causing the user device to display message indicating that the first media item is not available, wherein the message is to be displayed on the user device with a timer indicating time remaining before starting to play a next available media item;
determine whether a user preference is to play the first media item when the first media item becomes available or to skip to a next media item following the first media item on the playlist;
in response to determining that the user preference is to skip to the next media item on the playlist, cause the use device to advance to the next available media item on the playlist without user interaction;
in response to determining that the user preference is to play the first media item when the first media item becomes available, cause the user device to pause the playback of the plurality of media items from the playlist until the first media item becomes available; and
in response to determining that the first media item is available for the playback on the user device, cause the user device to play the first media item.

12. The apparatus of claim 11, wherein to cause the user device to advance further comprises to:
stream the next available media item to the user device; and
instruct a media player on the user device to skip the first media item and to play the next available media item.

13. The apparatus of claim 12, wherein to cause the user device to display the message comprises to transmit the message to the user device, wherein the message is to be displayed on the user device prior to playing the next available media item.

14. A non-transitory machine-readable storage medium storing instructions which, when executed, cause a processing device to perform operations comprising:
in response to receiving a request from a user device for a playlist, identifying a plurality of media items from the playlist;
causing the user device to display the plurality of media items from the playlist;
in response to receiving a user selection of a first media item directly from the displayed plurality of media items, determining whether the first media item is available for a playback on the user device;
in response to determining that the first media item is not available for the playback on the user device, causing the user device to display a message indicating that the first media item is not available, wherein the message is to be displayed on the user device with a timer indicating time remaining before starting to play a next available media item;
determining whether a user preference is to play the first media item when the first media item becomes available or to skip to a next media item following the first media item on the playlist;
in response to determining that the user preference is to skip to the next media item on the playlist, causing the use device to advance to the next available media item on the playlist without user interaction;
in response to determining that that the user preference is to play the first media item when the first media item becomes available, causing the user device to pause the playback of the plurality of media items from the playlist until the first media item becomes available; and
in response to determining that the first media item is available for the playback on the user device, causing the user device to play the first media item.

15. The non-transitory machine-readable storage medium of claim 14, wherein causing the user device to advance further comprises:
streaming the next available media item to the user device; and
instructing a media player on the user device to skip the first media item and to play the next available media item.

16. A method comprising:
in response to receiving a user request for a playlist, causing, by a processing device, a user device to present the playlist comprising a plurality of media items, and causing the user device to initiate a sequential playback of the plurality of media item;
in response to receiving a user selection of a first media item directly from the presented playlist comprising the plurality of media items and determining that the first media item is unavailable for the playback, causing the user device to delay the playback of a next available media item for a predetermined time and to display a message indicating that the first media item is not available, wherein the message is to be displayed on the user device with a timer indicating time remaining before playing the next available media item, the time remaining corresponding to the predetermined time;

determining a user preference is to play the first media item when the first media item becomes available or to skip to a next media item following the first media item on the playlist;

in response to determining that the user preference is to skip to the next media item on the playlist, causing the user device to continue to present the message on the user device, and causing the user device to advance to the next available media item in the playlist without user interaction; and in response to determining that the user preference is to play the first media item when the first media item becomes available, causing the user device to pause the playback of the plurality of media items from the playlist.

17. The method of claim 16, further comprising:

determining by a media player on the user device whether any of the plurality of media items are available for the playback.

18. The method of claim 16, wherein each unavailable media item is identified on the playlist using a visual indicator.

19. A non-transitory machine-readable storage medium storing instructions which, when executed, cause a processing device to perform operations comprising:

in response to receiving a user request for a playlist, causing a user device to present the playlist comprising a plurality of media items, and causing the user device to initiate a sequential playback of the plurality of media item;

in response to receiving a user selection of a first media item directly from the presented playlist comprising the plurality of media items and determining that the first media item is unavailable for the playback, causing the user device to display a message indicating that the first media item is not available, wherein the message is to be displayed on the user device with a timer indicating time remaining before playing a next available media item;

determining a user preference is to play the first media item when the first media item becomes available or to skip to a next media item following the first media item on the playlist;

in response to determining that the user preference is to skip to the next media item on the playlist, causing the user device to continue to present the message, and causing the user device to advance to the next available media item in the playlist without user interaction; and in response to determining that the user preference is to play the first media item when the first media item becomes available, causing the user device to pause the playback of the plurality of media items from the playlist until the first media item becomes available.

20. The non-transitory machine-readable storage medium of claim 19, wherein causing the user device to advance further comprises:

determining by a media player on the user device whether any of the plurality of media items are available for the playback.

* * * * *